US008466777B2

(12) United States Patent
Matsumoto et al.

(10) Patent No.: US 8,466,777 B2
(45) Date of Patent: Jun. 18, 2013

(54) TARGET OBJECT DETECTION SERVER

(75) Inventors: Satoki Matsumoto, Saitama (JP); Yoko Saito, Saitama (JP); Naohide Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 628 days.

(21) Appl. No.: 12/315,736

(22) Filed: Dec. 5, 2008

(65) Prior Publication Data

US 2009/0146795 A1    Jun. 11, 2009

(30) Foreign Application Priority Data

Dec. 7, 2007   (JP) ................................. 2007-316587

(51) Int. Cl.
*H04Q 5/22* (2006.01)
*G08B 26/00* (2006.01)
*G08B 1/08* (2006.01)
*G08B 13/14* (2006.01)
*G08B 21/00* (2006.01)

(52) U.S. Cl.
USPC .... 340/10.5; 340/10.1; 340/505; 340/539.13; 340/572.1; 340/686.6; 700/245; 700/258

(58) Field of Classification Search
USPC ...................................................... 340/10.5
See application file for complete search history.

(56) References Cited

U.S. PATENT DOCUMENTS

| 6,600,418 B2 * | 7/2003 | Francis et al. ............. 340/572.1 |
| 7,557,703 B2 * | 7/2009 | Yamada et al. ............ 340/539.1 |
| 2007/0061041 A1 * | 3/2007 | Zweig ........................... 700/245 |

FOREIGN PATENT DOCUMENTS

| JP | 2005-288554 | 10/2005 |
| JP | 2005-291716 | 10/2005 |
| JP | 2006-167844 | 6/2006 |
| JP | 2007-017414 | 1/2007 |

\* cited by examiner

*Primary Examiner* — Jennifer Mehmood
*Assistant Examiner* — John Mortell
(74) *Attorney, Agent, or Firm* — Carrier Blackman & Associates, P.C.; Joseph P. Carrier; William D. Blackman (57) ABSTRACT

A target object detection server is a detection server which communicates by wireless to a detector which detects whether or not a target object exists within a surrounding area of the detector by means of a detection tag mounted on the target object. Furthermore, the target object detection server connects through a network with one or more receivers which are arranged in a surrounding area of the target object, and receives a radio wave transmitted from the detection tag. According to the target object detection server mentioned above, it is possible to increase reliability for detecting the target object more accurately.

8 Claims, 8 Drawing Sheets

EXAMPLE OF TASKS

| TAG IDENTIFICATION NUMBER | CONTENT |
|---|---|
| Ta | GUIDE |
| Tb | GREETING |
| Tc | TRANSPORTING |
| Td | NO MOTION |
| ⋮ | ⋮ |

FIG. 4

EXAMPLE OF TASK MANAGEMENT TABLE

| TASK ID | PRIORITY | IMPORTANCE | ROBOT ID | CONTENT | START POSITION | END POSITION | REQUIRED TIME | START TIME | END TIME | STATUS |
|---|---|---|---|---|---|---|---|---|---|---|
| 1 | | 1 | | GUIDE | www, xxx, yyy | ooo, ppp, qqq | 3 | 10:27 | 10:30 | ENDED |
| 2 | | 3 | | GUIDE | | | 5 | 10:40 | 10:45 | WAITING |
| 3 | | 2 | | TRANSPORTING | | | 10 | 10:45 | 10:55 | RESERVED |
| 4 | | 4 | | GUIDE | | | 5 | 10:45 | 10:50 | RESERVED |
| ... | ... | ... | ... | ... | ... | ... | ... | ... | ... | ... |
| 10 | | 3 | | TRANSPORTING | ooo, ooo, ooo | xxx, yyy, zzz | 5 | 11:00 | 11:05 | NO PROCESSING |
| ... | ... | ... | ... | ... | ... | ... | ... | ... | ... | ... |

TARGET OBJECT DETECTION SERVER

BACKGROUND OF THE INVENTION

1. Field of the Invention

The present invention relates to a target object detection server for detecting a target object, more specifically, relates to a target object detection server which can increase the reliability for detecting the target object.

2. Description of Related Art

In recent years, a target object detection system has been developed. A conventional target object detection system detects a target object existing in a surrounding area of a detection apparatus by using a tag (for example, RFID) mounted on the target object. An apparatus in a Japanese Patent Laid-Open Application No. 2005-288554 discloses an example of these conventional apparatuses. The conventional target object detection system detects a presence of a target object by means of a detection apparatus. In this system, the detection apparatus periodically transmits a radio wave at a short interval, and the transmitted radio wave is received by a tag. Then, the tag which receives the transmitted radio wave transmits a radio wave at the same frequency as the received radio wave. Accordingly, by detecting the radio wave transmitted from the tag, the detection apparatus detects the presence of the target object.

Here, in some cases of these conventional target object detection systems, the target object is a person while the detection apparatus is a mobile robot. In this occasion, when the mobile robot detects a person, the mobile robot executes some motion (greeting or guide) for the detected person.

However, a communication system using a radio wave transmitted from the tag mounted on the target object tends to be affected by a surrounding environment. In some occasions, radio wave communication becomes so unstable as not to communicate effectively. For example, if the radio wave transmitted from the tag can not be detected by the detection apparatus, the detection apparatus can not detect the tag mounted on the target object. Therefore, with such a detection failure, eventually decreases the reliability for detecting the target object.

Additionally, if the number of target objects increases, this increases computational loads of a mobile robot. As a result, the same detection defect arises, which decreases the reliability for detecting the target object.

Therefore, it is an object of the present invention to provide a target object detection server which is capable of increasing the reliability for detecting a target object by addressing the detection defect as mentioned above.

SUMMARY OF THE INVENTION

A target object detection server of the present invention comprises a receiver information acquiring unit, a target position acquiring unit, and a target position transmitter. By using a detection tag mounted on a target object, the target object detection server communicates by wireless to a detector which detects whether or not the target object exists in a surrounding area of the detector. Further, the target object detection server connects through a network with at least one or more receivers arranged in a surrounding area of the target object for receiving the radio wave transmitted from the detection tag.

According to the target object detection server having the above described construction, the receiver receives a radio wave transmitted from the detection tag, which includes information on a tag discrimination number for identifying the detection tag. Then, through the receiver information acquiring unit, the target object detection server obtains receiver information transmitted from the receiver, which includes at least the tag identification number, electric field strength, and a reception time. Here, the target object detection server receives the receiver information in association with a receiver ID for identifying the receiver. Further, by the target position acquiring unit, the target object detection server obtains information on the target object position, which indicates the position of the target object based on the receiver information obtained by the receiver information acquiring unit and an arrangement position of the receiver which is beforehand associated with a receiver ID. Further, the target object detection server transmits the information on the target object position obtained by the target position acquiring unit, to the detector through the target position transmitter.

According to the present invention, the detector comprises a tag identification number storing unit, and a transmitted radio wave notice signal transmitter. When the detector receives a radio wave transmitted from the detection tag, the tag identification number storing unit stores the tag identification number which is included in the radio wave transmitted from the detection tag. The transmitted radio wave notice signal transmitter transmits a notice signal of receiving the detection tag transmitted radio wave, to the target object detection server; the notice signal indicates that the detector receives the detection tag transmitted radio wave from the detection tag. Further, the target object detection server comprises a transmitted radio wave notice signal receiver, a task data storing unit, a determination unit, and a deletion instruction unit.

According to the above mentioned construction of the target object detection server, through the transmitted radio wave notice signal receiver, the target object detection server receives a notice signal of receiving a detection tag transmitted radio wave; a notice signal being transmitted from the transmitted radio wave notice signal transmitter. Further, through the task data storing unit, the target object detection server stores a task in which the tag identification number of the detection tag mounted on the target object is associated beforehand with a motion which the detector executes for the target object. Further, the determination unit makes a determination based on the notice signal of receiving detection tag transmitted radio wave from the detection tag which is received by the transmitted radio wave notice signal receiver. By the determination unit, the target object detection server decides whether or not the tag identification number included in the detection tag transmitted radio wave from the detection tag and received by the detector is identical with the tag identification number associated with a task stored in the task data storing unit. Then, through the deletion instruction unit, the target object detection server instructs the detector to delete the tag identification number included in the detection tag transmitted radio wave, from the tag identification number storing unit.

According to the present invention, the target object detection server includes the task data storing unit and a traveling control unit, if the detector is an autonomous mobile robot.

According to the above mentioned construction, in the task data storing unit, the target object detection server stores a task where a motion executed by the detector for the target object is associated beforehand with the tag identification number of the detection tag mounted on the detector. When the mobile robot can not receive the detection tag transmitted radio wave from the detection tag and only the receiver receives the detection tag transmitted radio wave, the target object detection server instructs the mobile robot to travel to the target object by the traveling control unit, if the tag identification number associated with the task stored in the task data storing unit is identical with the tag identification number included in the receiver information.

According to the target object detection server mentioned above, the target object detection server comprises the task data storing unit, a current position acquiring unit, an inquiring unit, and a traveling control unit, if the detector is an autonomous mobile robot and a plurality of the mobile robots are provided.

According to the construction as mentioned above, in the task data storing unit, the target object detection server stores a task in which a motion executed by the detector for the target object is associated beforehand with the tag identification number of the detection tag mounted on the detector. The target object detection server obtains information on a current position of each mobile robot by the current position acquiring unit. Then, through the inquiring unit, the target object detection server obtains a notice by inquiring each mobile robot whether the robot is executing a task or on standby. The target object detection server instructs one or a plurality of the mobile robots to travel to the target object by the traveling control unit. The instruction is performed based on the information on the target object position obtained through the target position acquiring unit, the information of the current position of the mobile robot obtained through the current position acquiring unit, and the notice obtained through the inquiring unit.

According to the present invention, the reliability for the detector to detect the target object is increased because the receiver receives the detection tag transmitted radio wave from the detection tag, even if the detector can not receive the detection tag transmitted radio wave.

According to the present invention as mentioned above, computational loads of the detector can be reduced by conveying a deletion instruction to the detector. The mobile robot as a detector travels to the target object detected by the target object detection server. Herein, by controlling a plurality of the mobile robots, the appropriate mobile robot can travel to the target object detected by the target object detection server.

DETAILED DESCRIPTION OF THE PREFERRED EMBODIMENT

Figure 1:
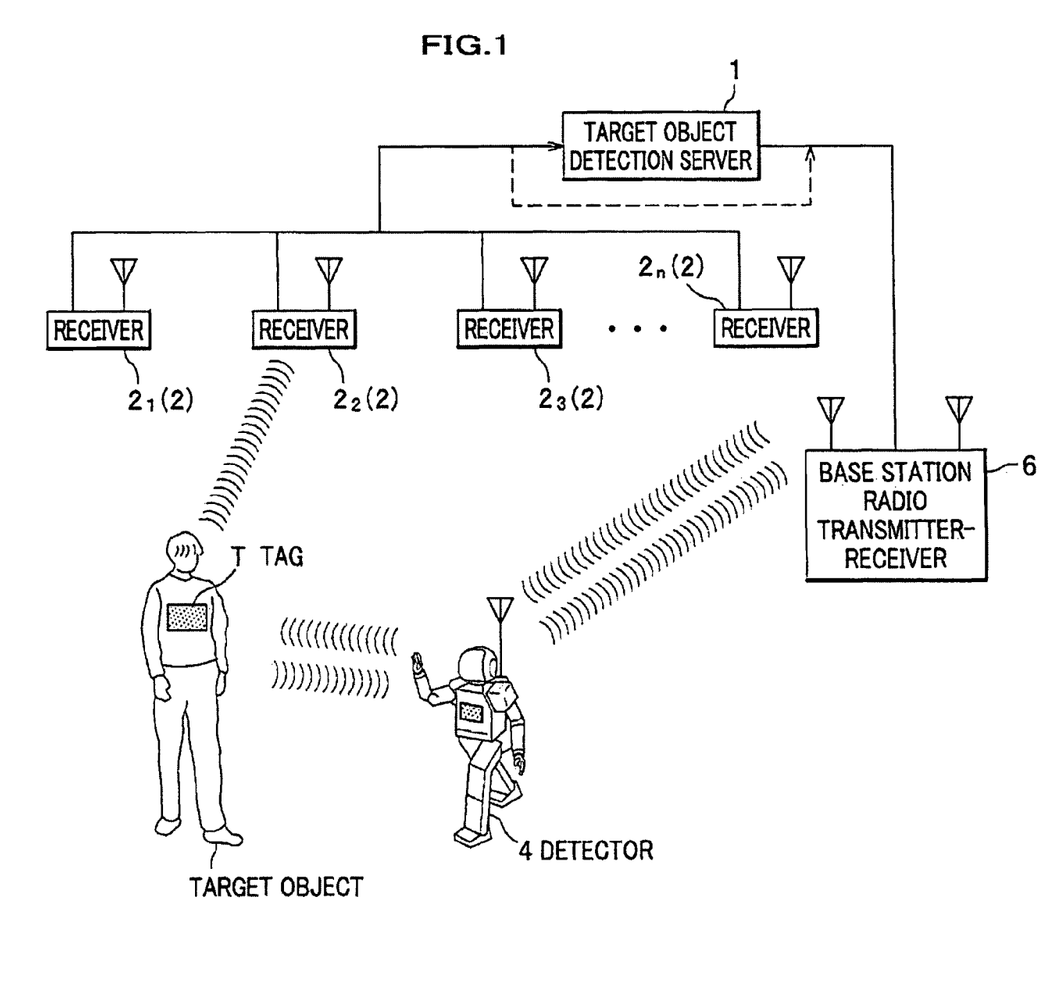
FIG. 1 is a drawing showing a system configuration of the target object detection server according to the present embodiment.

Here will be described the present invention in detail according to embodiments and attached drawings of the invention. FIG. 1 is a drawing showing a system configuration of a target object detection server. As shown in FIG. 1, a target object detection system S is a detection system for detecting a target object comprising a target object detection server 1, a plurality of receivers 2 ($2_1$, $2_2$, $2_3$, . . . , $2_n$), a detector 4, and a base station radio transmitter-receiver 6. Before explaining the target object detection server 1 and the detector 4, the target object, the receiver 2 and the base station radio transmitter-receiver 6 will be explained. Here, the detector 4 is a mobile robot capable of traveling in this embodiment. In the following explanation, the detector 4 is occasionally referred to as a robot, and an identification for identifying the detector 4 is referred to as a robot ID.

Here, the target object is a person or a substance (only a person is shown in this embodiment) on which a detection tag T is mounted (attached). A detection tag T memorizes beforehand a tag identification number for identifying the detection tag T. When the detection tag T receives a detector transmitted radio wave from the detector 4, the detection tag T transmits a radio wave including information on both the robot ID and the tag identification number. Thus, the detection tag transmitted radio wave from the detection tag T includes the information on the detector 4. Herein, the detection tag T is a general RFID (Radio Frequency Identification).

The receiver 2 receives the detection tag transmitted radio wave from the detection tag T and transmits the information on the detection tag transmitted radio wave through a network to the target object detection server 1. Here, the receiver 2 can also receive the detector transmitted radio wave from the detector 4. The detector transmitted radio wave from the detector 4 is identified by the target object detection server 1.

Further, several receivers 2 are arranged at various positions in the area where a person with the detection tag T travels so that the receiver 2 can receive the detection tag transmitted radio wave from the detection tag T wherever the person is in the area. For example, if the area is such a wide ranged area as a hall or a long and narrow area like a passage, a lot of receivers 2 are arranged to receive the radio wave transmitted from the detection tag T present anywhere.

Further, the receiver 2 and the target object detection server 1 are connected with a LAN (Local Area Network). Here, the receiver 2 and the target object detection server 1 are not connected wirelessly because interference with the detector 4 and interference between the receivers 2 could occur.

The base station radio transmitter-receiver 6 transmits wirelessly information transmitted from the target object detection server 1, to the detector 4; the information is data on the position of the target object (details are mentioned later). Further, the base station radio transmitter-receiver 6 receives wirelessly a notice signal of receiving the detector transmitted radio wave from the detector 4 (details are mentioned later).

Here, if a function of the target object detection server 1 is integrated into the detector 4, the base station radio transmitter-receiver 6 needs only a function for transmitting information on the receiver transmitted radio wave to the detector 4. FIG. 1 only shows one target object and one detector 4. There may be a plurality of the target objects and detectors 4.

(Construction of the Target Object Detection Server)

Figure 2:
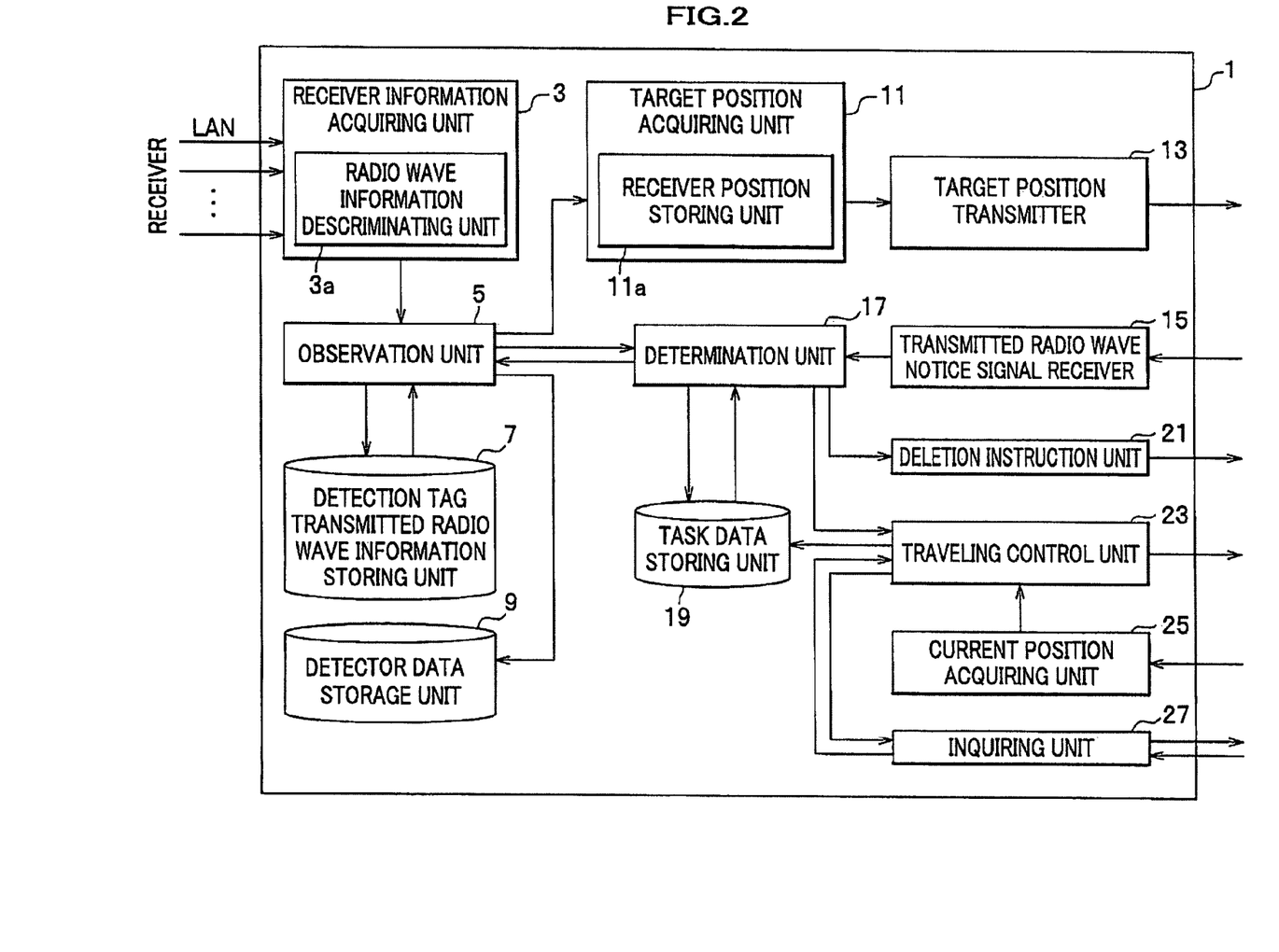
FIG. 2 is a block diagram showing the target object detection server according to the present embodiment.

The target object detection server 1 receives the information on a detection tag transmitted radio wave from the receiver 2. Then, the target object detection server 1 transmits target position information indicating the position of the target object to the detector 4 through the base station radio transmitter-receiver 6. FIG. 2 shows a detailed construction of the target object detection server 1.

As shown in FIG. 2, the target object detection server 1 comprises: a receiver information acquiring unit 3, an observation unit 5, a detection tag transmitted radio wave information storing unit 7, a detector data storage unit 9, a target position acquiring unit 11, a target position transmitter 13, a transmitted radio wave notice signal receiver 15, a determination unit 17, a task data storing unit 19, a deletion instruction unit 21, a traveling control unit 23, a current position acquiring unit 25, and an inquiring unit 27.

The receiver information acquiring unit 3 obtains the information on the detection tag transmitted radio wave from the receiver 2. The detection tag transmitted radio wave information includes at least a receiver ID for identifying the receiver 2, a tag identification number, an electric field strength, and a reception time. In some occasions, from the receiver 2, the receiver information acquiring unit 3 obtains information on a detector transmitted radio wave from the detector 4 besides information on the detection tag transmitted radio wave from the detection tag T.

Herein, there is an occasion that the information on the detector transmitted radio wave includes information on the detector 4. That is, since the detector transmitted radio wave includes the robot ID which is included in the detector transmitted radio wave from the detector 4, the detector 4 can be identified according to the information on the detector transmitted radio wave. Therefore, the target object detection server 1 can identify which detector 4 transmits the radio wave received by the detection tag T, if a plurality of detectors 4 are provided.

Hence, the receiver information acquiring unit 3 includes a radio wave information discriminating unit 3a which discriminates the detection tag transmitted radio wave information transmitted from the detection tag, from the detector transmitted radio wave information transmitted from the detector 4. The radio wave information discriminating unit 3a discriminates the detection tag transmitted radio wave information from the detector transmitted radio wave information by checking whether the tag identification number is included in the radio wave information. That is, the detection tag transmitted radio wave information from the detection tag T necessarily includes the tag identification number.

The observation unit 5 outputs radio wave information supplied from the receiver information acquiring unit 3 and other radio wave information transmitted from the detector 4, into the detection tag transmitted radio wave information storing unit 7 or the detector data storage unit 9 according to discrimination by the radio wave information discriminating unit 3a, and stores the information.

Further, the observation unit 5 determines whether transmitted radio wave information output from the receiver information acquiring unit 3 is new or already stored in the detection tag transmitted radio wave information storing unit 7. If the observation unit 5 determines that the transmitted radio wave information is already stored, the observation unit 5 deletes the information. Further, the observation unit 5 reads out information in the transmitted radio wave from the detection tag transmitted radio wave information storing unit 7, and supplies the information to the target position acquiring unit 11 and the decision unit 17.

The detection tag transmitted radio wave information storing unit 7 stores the detection tag transmitted radio wave information (receiver information) supplied from the observation unit 5. The detection tag transmitted radio wave information storing unit 7 includes a general hard disk and a memory.

The target position acquiring unit 11 obtains the target position information indicating the position of the target object based on the information on the detection tag transmitted radio wave supplied from the observation unit 5 (receiver information) and an arrangement position of the receiver 2 associated beforehand with the receiver ID. The target position acquiring unit 11 includes a receiver position storing unit 11a which stores beforehand the data on the arrangement position of the receiver 2.

The target position acquiring unit 11 obtains target position information based on the arrangement position of each receiver 2 which is associated beforehand with each receiver ID of the receiver 2 receiving the transmitted radio wave, if there are a plurality of transmitted radio wave data (in the case that the radio wave transmitted from the same detection tag T (refer to FIG. 1) is received by a plurality of receivers 2)). For example, if a radio wave transmitted from the same detection tag T is received by three receivers 2, the target position acquiring unit 11 calculates the target position based on the arrangement positions of three receivers 2 by adding the respective electric field strengths received by the respective receivers 2 into the calculation.

Further, even if there are a plurality of detectors 4, the target position acquiring unit 11 can identify the detector 4 based on the robot ID which is included in the detector transmitted radio wave from the detector 4. Hereby, if the robot ID included in the detection tag transmitted radio wave from the detection tag is not accurately identified, the detector 4 may not be identified.

The target position transmitter 13 transmits information on the target position obtained by the target position acquiring unit 11, to the detector 4. If there are a plurality of detectors 4 and one of the detectors 4 is specified by the target position acquiring unit 11, the target position transmitter 13 transmits the target position information only to the specified detector 4. In contrast, if there are a plurality of detectors 4 and no detector 4 is specified by the target position acquiring unit 11, the target position transmitter 13 transmits the target position information to all of the detector 4.

Further, the target position transmitter 13, for example, is capable of periodically transmitting the target position information and the information on the position of other detectors 4 to a plurality of detectors 4. Thanks to this function, as is explained below, if the autonomous mobile robot which is the detector 4 is placed, the robot can autonomously generate a travelling route to a destination (coordinates determined by target position information) so that the robot does not collide with any persons or detectors 4 those are target objects, even when the robot is placed in an area where there are many people being target objects.

The transmitted radio wave notice signal receiver 15 receives a notice signal for receiving a detector transmitted radio wave transmitted from the detector 4. The notice signal for receiving the detector transmitted radio wave received by the transmitted radio wave notice signal receiver 15 is supplied to the determination unit 17.

The determination unit 17 determines whether or not a tag identification number included in the detector transmitted radio wave received by the detector 4, is identical with a tag identification number which is associated with each task, based on a transmitted radio wave notice signal supplied from the transmitted radio wave notice signal receiver 15 and task data stored in the task data storing unit 19.

If both tag identification numbers are not identical with each other, the determination unit 17 instructs the deletion instruction unit 21 to supply a deletion instruction to the detector 4 for deleting the detector transmitted radio wave information stored in the detector 4.

If both tag discrimination numbers are identical each other, the determination unit 17 instructs the traveling control unit 23 to supply to the detector 4 a traveling instruction for the detector 4 to travel.

Furthermore, the determination unit 17 instructs the observation unit 5 to read out detection tag transmitted radio wave information in the detection tag transmitted radio wave information storing unit 7. Then, the determination unit 17 determines whether or not the tag identification number included in the information on the detection tag transmitted radio wave received from the observation unit 5 is identical with the tag identification number included in the transmitted radio wave received by the detector 4 included in the notice signal for receiving transmitted radio wave.

If both tag identification numbers are identical with each other, there is no problem because the transmitted radio wave received by the detector 4 is identical with the transmitted radio wave received by the receiver 2. However, if both tag identification numbers are not identical with each other, the detector 4 may not receive the transmitted radio wave because generally the number of transmitted radio wave received by the receiver 2 is larger than the number of transmitted radio wave received by the detector 4.

In this occasion, the decision unit 17 decides whether or not the tag identification number included in the transmitted radio wave information obtained by the receiver information acquiring unit 3 and received by the receiver 2, is identical with the tag identification number associated with the respective task stored in the task data storing unit 19. If both tag identification numbers are identical, the determination unit 17 instructs the traveling control unit 23 to supply a traveling instruction to the detector 4 for having the detector 4 travel.

In the occasion, even if both tag identification numbers are not identical with each other, it is possible that the determination unit 17 instructs the traveling control unit 23 to supply the traveling instruction to the detector 4 for having the detector 4 travel. This instruction is not conducted so that the detector 4 executes a task for the target object. This is operation conducted so that the detector 4 only confirms the presence of the target object.

The task data storing unit 19 stores task data which associates beforehand the tag identification number with the motion of the detector 4 performed for the target object. The task data storing unit 19 includes a general hard disk and a memory. Here, an example of a task will be explained with referring to FIG. 3.

Figure 3:
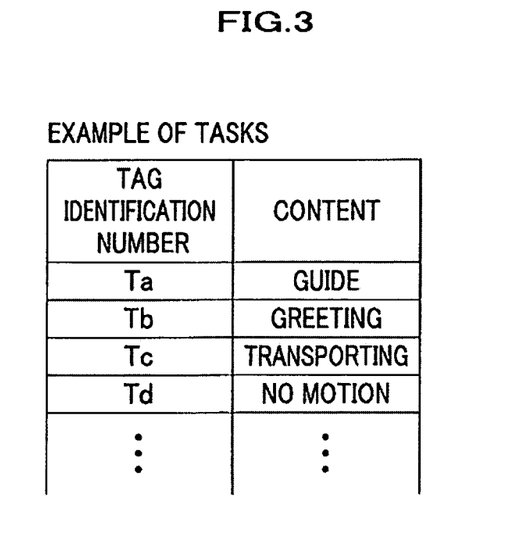
FIG. 3 is a drawing showing an example of tasks.

As shown in FIG. 3 showing an example of tasks, the tag identification number is associated with the content of a motion (content) beforehand. In FIG. 3, tag identification numbers: Ta, Tb, Tc and Td are associated respectively with "guide", "greeting", "transporting", and "no motion". "Guide" represents a motion for a person as the target object in which the detector 4 travels near the person and guides the person to the predetermined position. "Greeting" represents a motion for a person as the target object in which the detector 4 makes a bow with stopping traveling. Further, if the target object is a material, "transporting" represents a motion in which the detector 4 transports the material. Further, "no motion" represents a motion in which the detector 4 executes no motion.

As shown in FIG. 3, since the tag identification number is associated with the motion, only an associated motion is determined for the detector 4, if a target object is detected in a surrounding area of the detector 4.

Figure 4:
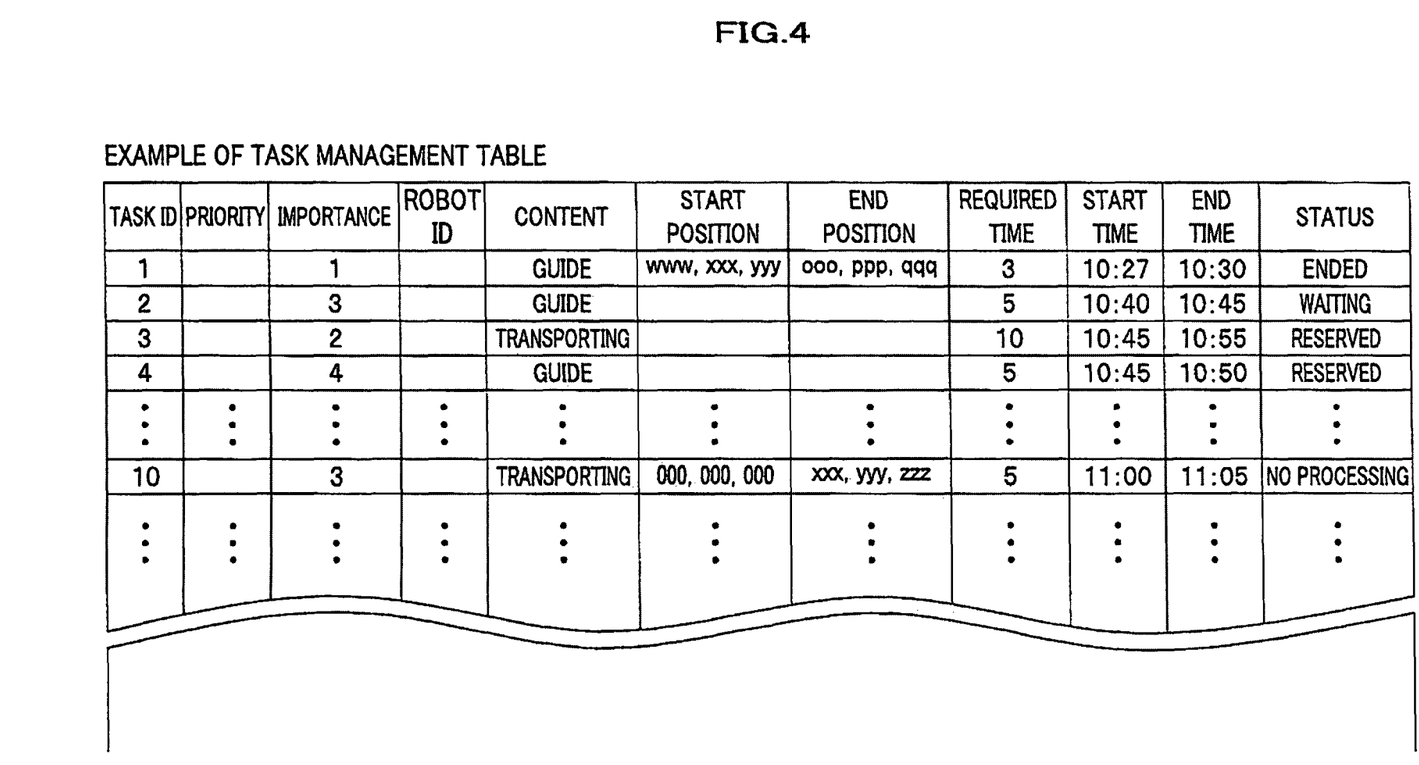
FIG. 4 is a drawing showing an example of a management table.

In FIG. 2, if the traveling control unit 23 outputs an instruction to the detector 4 for executing a task, the task data storing unit 19 stores a task management table for managing the task being executed by the detector 4. FIG. 4 shows an example of the task management table.

As shown in FIG. 4, the task management table includes content information on tasks and status information on tasks as information items. The content information on tasks includes a task ID which is a unique identifier assigned to each task, priority of a task, importance of a task, a robot ID which is an identifier for the detector 4 executing the task such as guide and transporting (material carrying). The status information on tasks includes a start position where the task is started (start position) within a task operation area, an end position where the task is ended within the task operation area (end position), a required time for executing the task (required time), a scheduled time for starting the task (start time), and a scheduled time for ending the task (end time) as information items.

As shown in FIG. 2, if the deletion instruction unit 21 receives a deletion instruction from the decision unit 17 to delete the transmitted radio wave information stored in the detector 4, the deletion instruction unit 21 outputs the deletion instruction to the detector 4. By the deletion instruction unit 21, computational loads of the detector 4 can be reduced by means of deleting information managed by the detector 4.

If the traveling control unit 23 receives a traveling instruction from the decision unit 17 for having the detector 4 travel, the traveling control unit 23 outputs the traveling instruction to the detector 4. The traveling control unit 23 controls the detector 4 for traveling in compliance with the traveling instruction.

Further, if a plurality of detectors 4 are provided, the traveling control unit 23 has the inquiring unit 27 inquire each of the detectors 4 whether each detector is able to travel at the moment. Then, the traveling control unit 23 obtains an answer from each of the detectors 4 (able to travel, unable to travel).

If the traveling control unit 23 obtains an answer telling able to travel, the traveling control unit 23 controls the detector 4 for traveling. If a plurality of detectors 4 are provided, the traveling control unit 23 controls the detector 4 nearest being able to travel. The nearest detector 4 is determined based on the information on the current position of the detector 4 obtained by the current position acquiring unit 25.

Here, in this occasion, if the receiver information acquiring unit 3 receives information on the radio wave transmitted from the same receiver 2 within a predetermined period, it is possible that the traveling control unit 23 controls the detector 4 to travel which answers able to travel, even if a task is assigned to the detector 4 or not.

The current position acquiring unit 25 obtains information on the current detector position which is periodically transmitted from the detector 4, and outputs the information to the traveling control unit 23. Herein, the information on a current detector position is obtained by a gyro sensor or other GSP receivers provided on the detector 4. Further, the traveling control unit 25 can calculate the information on the current position of the detector 4 based on "the detector transmitted radio wave information transmitted from the detector 4". The detector transmitted radio wave information is transmitted from the detector 4 and received by the receiver 2. Then the detector transmitted radio wave information is transmitted from the receiver 2 and stored in the detector data storage unit 9.

The inquiring unit 27 inquires of the detector 4 in compliance with the instruction by the traveling control unit 23 whether the detector 4 is able to travel (whether completes the assigned task or is standby). Further, the inquiring unit 27 receives an answer transmitted from the detector 4, and supplies the answer to the traveling control unit 23.

(Construction of the Detector)

The detector 4 is an autonomous mobile robot (hereinafter indicated as a robot R on occasion). The robot R detects the target object existing within a predetermined area by receiving the radio wave transmitted from the detection tag T. Further, the robot R performs a motion such as traveling or the like based on the information on the position of the target object transmitted through the base station radio transmitter-receiver 6 from the target object detection server 1.

Figure 5:
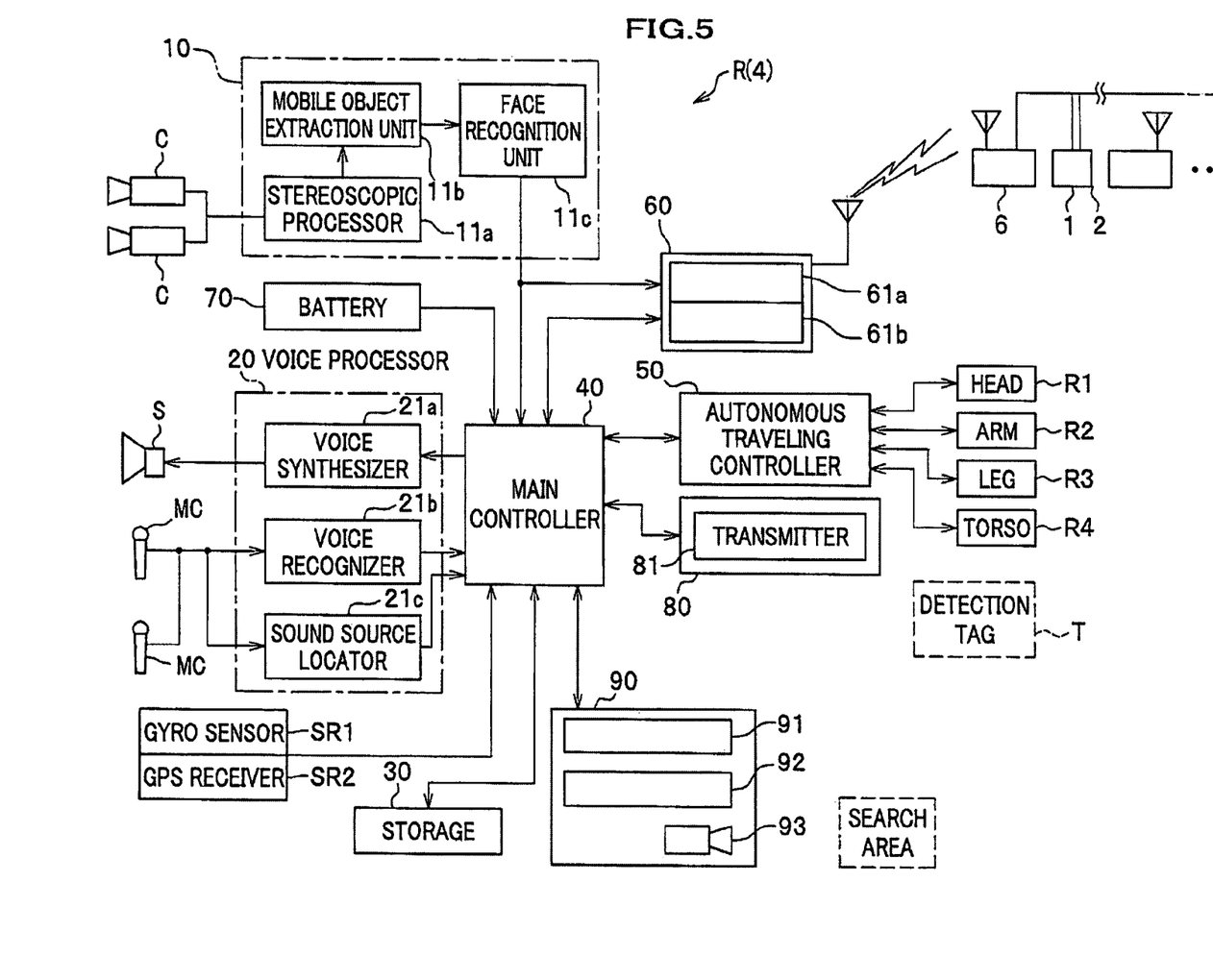
FIG. 5 is a block diagram of the detector (robot).

FIG. 5 is a block diagram showing a detailed construction of the robot R. The robot R comprises a head R1, an arm R2, a leg R3, a torso R4 and a back storage R5. In addition, the robot R comprises at an appropriate position of each R1-R5, cameras C, C, a speaker S, microphones MC, MC, an image processor 10, a voice processor 20, a storage 30, a main controller 40, an autonomous traveling controller 50, a radio communication unit 60, a battery 70, a target object detector 80, and a surrounding-state detector 90.

The robot R includes a gyro sensor SR1 for detecting a direction which the robot R directs to and a GPS (Global Positioning System) receiver SR2 for obtaining coordinates data of a position where the robot R exists on a predetermined map.

(Camera)

The cameras (image sensors) C, C acquire images in a forward traveling direction of the robot R in a form of digital data. For example, a color CCD (Charge-Coupled Device) camera is adopted as a camera. Cameras C, C are installed horizontally one at the right position and the other at the left position. The images acquired by the cameras C, C are supplied to the image processor 10. The cameras C, C, a speaker S and microphones Mc, Mc are all provided within the head R1. The speaker S (voice output unit) can generate a predetermined voice synthesized by a voice processor 20.

(Image Processor)

The image processor 10 (image processing unit) recognizes a person and an obstacle in the surrounding area, in order to recognize the condition of the surrounding area of the robot R based on images acquired by the cameras C, C. The image processor includes a stereoscopic processor 11a, a mobile object extracting unit 11b, and a face recognition unit 11c.

The stereoscopic processor 11a performs a pattern matching between images obtained from each camera C on the base of one of two images acquired by the cameras C, C. Then the stereoscopic processor 11a computes a parallax between two images to generate a parallax image, and outputs the parallax image to the mobile object extracting unit 11b together with the images entered from the camera C, C. Here, the parallax indicates a distance from the robot R and the object.

The mobile object extracting unit 11b extracts a mobile object from the images obtained by the camera C, C, based on data entered from the stereoscopic processor 11a. The reason why the mobile object is extracted is to recognize a person on the assumption that the moving object is a person.

The mobile object extracting unit 11b stores images of several frames obtained previously for extracting a mobile object. The mobile object extracting unit 11b performs the pattern matching in order to extract the mobile object, and computes a distance for corresponding pixels in two images to generate a distance image. Here, the pattern matching is performed by comparing the current frame (image), which was obtained currently by the camera C, with the latest frame (image), which is generated from several frames obtained prior to the acquisition of the current frame. Then, the mobile object extracting unit 11b, based on the distance image and the parallax image, searches the pixels whose shift amount is large, from among the pixels within a predetermined distance from the camera C, C. If such pixels exist, the mobile object extracting unit 11b considers that a person is within the pixels, and extracts a mobile object from the image entered from the camera based on the distance image and parallax image. Then the mobile object extracting unit 11b outputs the image of the mobile object to the face recognition unit 11c.

The face recognition unit 11c recognizes a face area and a position of a face in consideration of a size and shape of the extracted part of the mobile object. In a similar way, the face recognition unit 11c also recognizes a position of a hand in consideration of a size and shape of the extracted part of the mobile object.

The position of the recognized face is supplied to a main controller 40 for communicating with a person and for actuating the robot R.

(Voice Processor)

The voice processor includes a voice synthesizer 21a, a voice recognizer 21b and a sound source locator 21c. The voice synthesizer 21a generates voice data from text information based on a command, which commands the robot R to have a conversation with a human or to sound a voice message which is entered from the main controller 40. Then, the voice synthesizer 21a outputs voice data to the speaker S. Here, the generation of voice data is performed by utilizing the correspondence between voice data and text information stored beforehand in a storage 30. The voice data is obtained from a management computer and stored in the storage 30.

The voice recognizer 21b generates text information from voice data which is supplied from microphones MC, MC. Then the voice recognizer 21b outputs text data to the main controller 40. Herein, the correspondence between voice data and text information is stored beforehand in the storage 30.

The sound source locator 21c specifies a position of a sound source (a position on a plane which the robot R recognizes) based on a difference of a sound pressure and a difference of a sound arrival time between the microphones MC, MC. Then, the sound source locator 21c outputs the position data to the main controller 40. The position of a sound source is represented, for example, by a rotation angle $\theta z$ about the z direction axis at which the robot R stands.

(Storage)

The storage 30, for example, includes a general hard disk and stores information (information on a target position) transmitted from the target object detection server 1. Further, the storage 30 stores information needed to perform respective motions for the main controller 40.

Further, the same ways as the target object detection server 1, the storage 30 stores information on detection tag transmitted radio wave which is detected by a target object detector 80 (same as the detection tag transmitted radio wave information storing unit 7). In addition, the storage 30 stores data (target position information) transmitted from the target object detection server 1 as well.

The main controller 40 controls the image processor 10, the voice processor 20, the storage 30, the autonomous traveling controller 50, the radio communication unit 60, the target object detector 80, and the surrounding-state detector 90. Data detected by the gyro sensor SR1 and GPS receiver SR2 is supplied to the main controller 40, and used for determining a motion of the robot R. Further, the data detected by the gyro sensor SR1 and GPS receiver SR2 is transmitted from the radio communication unit 60 to the target object detection server 1.

The main controller 40, for example, performs control operations for: communicating with the target object detection server 1, executing a predetermined task in compliance with an instruction of a traveling control supplied by the target object detection server 1, having a robot R travel to a destination (coordinates determined by information on a position of a target object or coordinates of a mobile area where a person of a target object travels), recognizing a person, and talking with a person. In order to perform these control operations, the main controller 40 makes a variety of decisions and generates instructions for working each corresponding unit. Here, a destination to which the robot R travels includes "coordinates of an area where a target person travels" because the destination includes a position (for example, a meeting room) where the target person is present.

Further, the main controller 40, supplies information on a target object position which is transmitted from the target object detection server 1 and received by the radio communication unit 60, to the storage 30 for storing the information.

Further, if the main controller 40 receives detection tag transmitted radio wave transmitted from the receiver 2 (refer to FIG. 1) through a target object detector 80, the main controller 40 makes the storage 30 store the information on the detection tag transmitted radio wave. Also, the main controller transmits a notice signal for receiving detection tag transmitted radio wave from the radio communication unit 60 to the target object detection server 1.

Further, the main controller 40 makes the storage 30 delete the detection tag transmitted radio wave information (a tag identification number included in the detection tag transmitted radio wave) stored in the storage 30 in compliance with a deletion instruction transmitted from the target object detection server 1.

Further, the main controller 40 determines whether a robot R is able to travel responding to an inquiry for the traveling capability which is transmitted from the target object detection server 1. If the main controller 40 determines that the robot R is able to travel, the main controller 40 transmits an answer that the robot R is able to travel, from the communication unit 60 to the target object detection server 1. In contrast, if the main controller 40 decides that the robot R is unable to travel, the main controller 40 transmits an answer that the robot R is unable to travel.

(Autonomous Traveling Controller)

The autonomous traveling controller 50 drives the head R1, arm R2, leg R3 and torso R4 following an instruction from the main controller 40. The autonomous controller 50, not shown, includes a head controller for driving a net joint of the head R1, a hand controller for driving a finger joint at a top of the arm R2, a shoulder joint and elbow joint of the arm R2, an arm controller for driving a wrists joint, a waist controller for rotationally driving the torso R4 in a horizontal direction to the leg R3, and a leg controller for driving a thigh joint, knee joint and ankle joint of the leg R3. These head controller, hand controller, arm controller, waist controller, and leg controller output a driving signal to an actuator which drives the head R1, arm R2, leg R3 and torso R4.

The radio communication unit 60 is a communication device for transmitting data to and receiving data from the target object detection server 1. The radio communication unit 60 includes a public line radio communication device 61a and a wireless communication device 61b. The public line radio communication device 61a is a radio communication means utilizing a public line such as a cellular phone line and PHS (Personal Handyphone System). The wireless communication device 61b is a wireless communication means by using a short-range wireless communication technique such as a wireless LAN (Local Area Network) complying with IEEE802.11b standard. The radio communication unit 60 performs a data communication with the target object detection server 1 by selecting either of the public line communication device 61a or the wireless communication device 61b following a connection requirement from the target object detection server 1.

The battery 70 is a supply source for electricity needed for a motion and process of a respective unit of the robot R. The battery 70 is a rechargeable type battery. Electricity is supplied to the battery 70 at a battery recharging site (not shown).

Object Detector

The object detector (object detection means) 80 detects a person with a detection tag in a surrounding area of the robot R. The object detector 80 provides a plurality of transmitters 81 (FIG. 5 shows only one transmitter 81). These transmitters 81 are arranged at a front, back, right and left side along an outer surface of a head R1 of the robot R1 (not shown in Figs.). The object detector 80 transmits a radio wave from the transmitter 81 at a respective frequency for recognizing a respective mobile robot. Also, the objective detector 80 receives a radio wave transmitted from the detection tag which receives the radio wave transmitted from the transmitter 81.

Further, the object detector 80 obtains an angle of the detection tag T measured from the robot R by using an optical communication technique. The object detector 80 obtains (r,θ) coordinates (absolute coordinates) measured from the robot R by obtaining the angle of the detection tag T measured from the robot R and the electric field strength of the radio wave transmitted from the detection tag T.

Therefore, the object detector 80 can identify a position of the detection tag T (a distance and a direction) as a position of a person according to the detection tag transmitted radio wave. Further, the object detector 80 transmits not only a radio wave from the transmitter 81 but also a radio wave including a signal indicating a robot ID from an antenna (not shown in Figs.). In this method, the tag T which receives the radio wave correctly specifies the robot R transmitting the radio wave.

Here, the object detector 80 makes the storage 30 store the transmitted radio wave data from the detection tag T. The details on the object detector 80 and the detection tag T are disclosed, for example, in a Japanese Laid-Open Patent Application No. 2005-291716.

(Surrounding-State Detector)

The surrounding-state detector 90 detects a surrounding state of the robot R. The surrounding-state detector 90 can obtain information on a current detector position (self-position data) detected by the gyro sensor SR1 or GPS receiver SR2. Further, the surrounding-state detector 90 includes a laser irradiation unit 91 for emitting a slit light towards a search area, an infrared irradiation unit 92 for irradiating an infrared light towards the search area, and a deck camera 93 for acquiring images of the search area irradiated by the slit light or the infrared light. The surrounding-state detector 90 detects a road surface state by analyzing slit light images (images acquired by slit light irradiation) acquired by the deck camera 93. Further the surrounding-state detector 90 detects a mark M (not shown in Figs.) by analyzing infrared light images (images acquired by infrared light irradiation) acquired by the deck camera 93. Then, the surrounding-state detector computes a relative position relationship between the mark M and the robot R based on the detected position of the mark M (coordinates). Here, the details on the surrounding-state detector 90 are disclosed, for example, in a Japanese Laid-Open Patent Application No. 2006-167844.

(Operation of the Target Object Detection Server 1)

Figure 6:
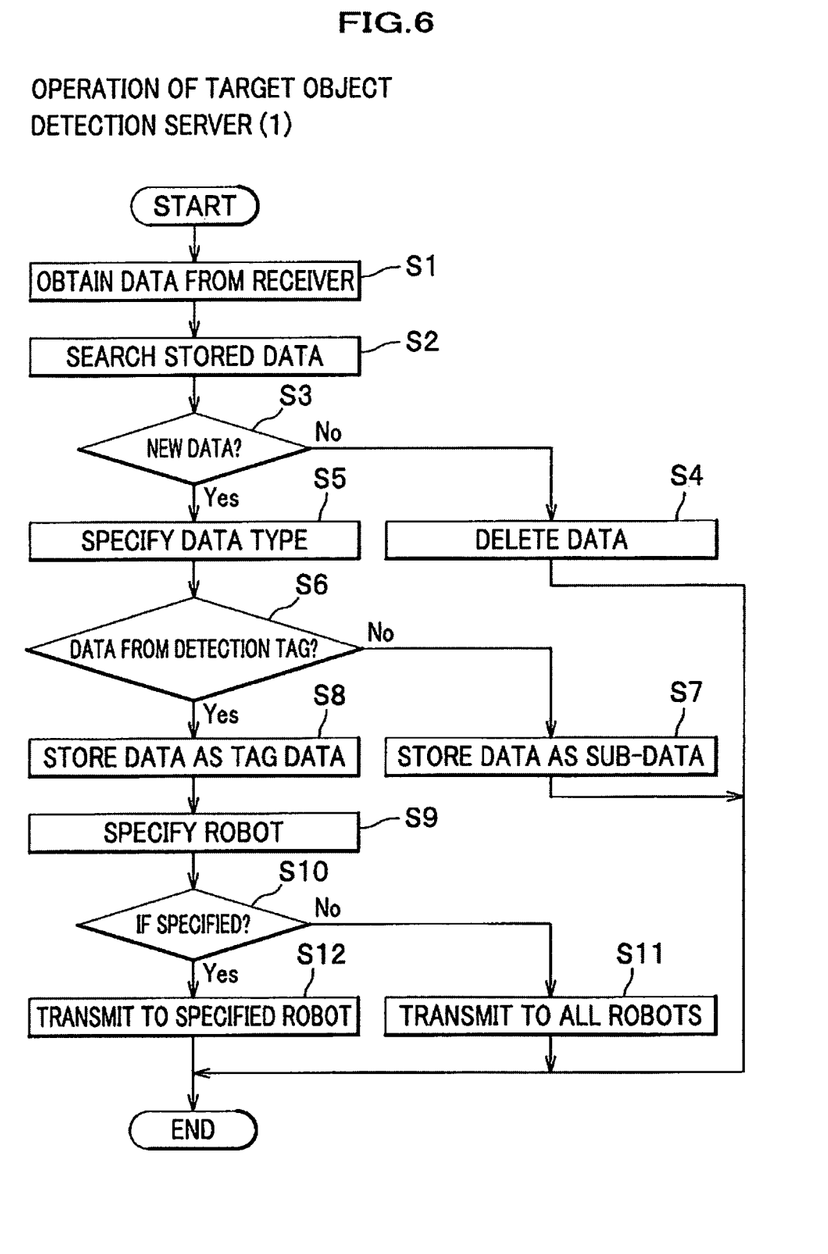
FIG. 6 is a flowchart showing an operation of the target object detection server (1).

Next, an operation of the target object detection server 1 will be explained with reference to a flow chart shown in FIG. 6 (properly with reference to FIGS. 1, 2). Hereof, the operation of the target object detection server 1 is an operation when there are a plurality of detectors 4 (robots R). Firstly, the target object detection server 1 inputs data from the receiver 2 by means of the receiver information acquiring unit 3 to obtain receiver information or information on a radio wave transmitted from the robot R(Step S1). Then, by retrieving the transmitted radio wave information storing unit 7 through the observation unit 5 (Step S2), the target object detection server 1 decides whether the obtained data is a new data or not (Step S3).

If the target object detection server 1 determines that the obtained data is not a new data (Step S3: No), the target object detection server deletes the data (receiver information)(Step S4). If the target object detection server 1 determines that the obtained data is a new data (Step S3: Yes), the target object detection server 1 specifies a type of the data by the radio wave information classifying unit 3a of the receiver information acquiring unit (Step S5) and determines whether or not the obtained information is data transmitted from the detection tag (decides whether or not the obtained data is receiver information) (Step S6).

Then, if the target object detection server 1 decides that the obtained information is not data transmitted from the detection tag T (Step S6: No), the target object detection server 1 makes the data storage unit 9 store the data through the observation unit 5 as sub-data (information on radio wave transmitted from the robot R) (Step S7).

If the target object detection server 1 decides that the obtained information is data transmitted from the detection tag T (Step S6: Yes), the target object detection server 1 makes the transmitted radio wave information storing unit 7 store the data through the observation unit 5 as tag data (Step S8). Then, the target object detection server 1 obtains information on a target object position by the target position acquiring unit 11 and specifies the robot R based on the robot ID included in the radio wave transmitted from the detection tag (Step S9).

Next, The target object detection server 1 decides whether the robot R is specified or not (Step S10). If the robot R is not specified (Step 10: No), the target object detection server 1 transmits information on a target object position to all of the robots R (Step S11). If the robot R is specified (Step 10: Yes), the target object detection server 1 transmits the information on the target object position to the specified robot R (Step S12).

(Operation of the Target Object Detection Server 2)

Figure 7:
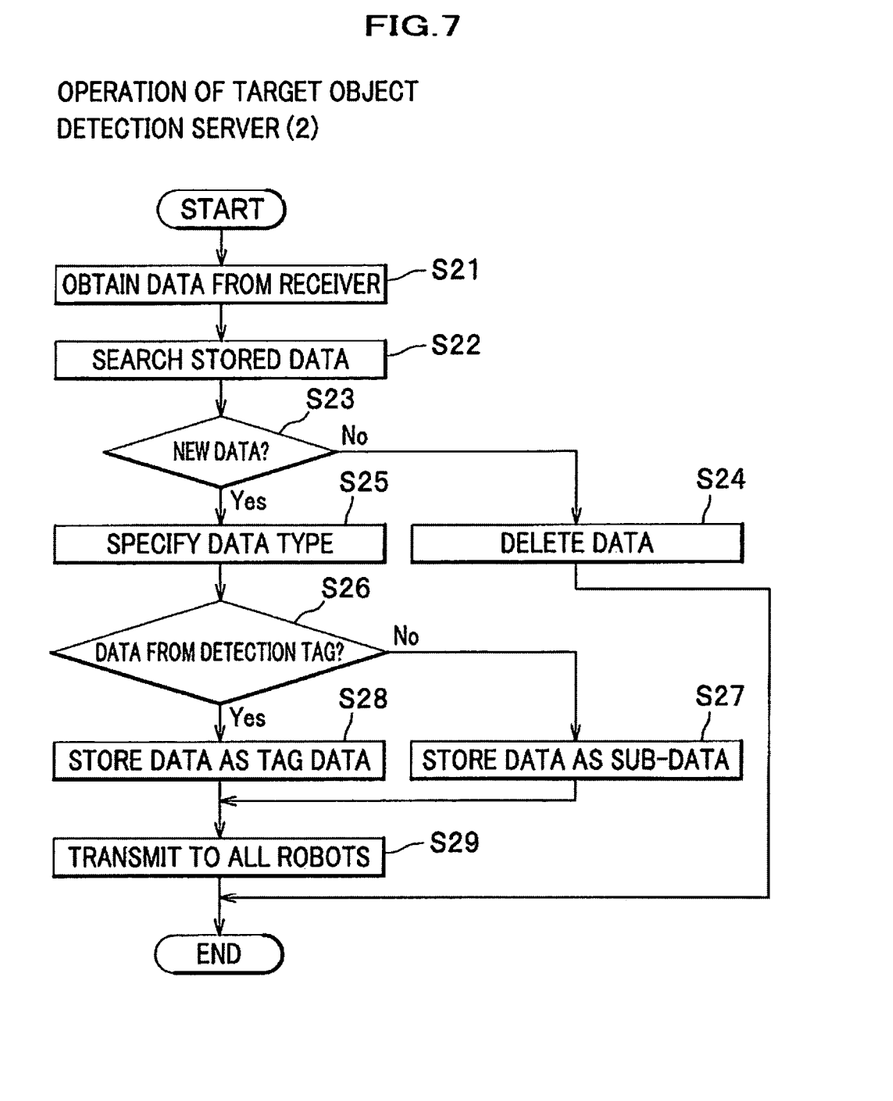
FIG. 7 is a flowchart showing an operation of the target object detection server (2).

Next, the operation of the target object detection server 1 will be explained with reference to a flow chart shown in FIG. 7 (properly refer to FIGS. 1, 2). Hereof, when there are a plurality of detectors 4 (robots R), the operation of the target object detection server 1 represents an operation for periodically transmitting information on the target object position and information on the positions of other detectors to a plurality of detectors 4 (robots R).

Firstly, the target object detection server 1 inputs data from the receiver 2 through the receiver information acquiring unit 3 to obtain receiver information or information on a radio wave transmitted from the robot R(Step S21). Then, by retrieving the transmitted radio wave information storing unit 7 by means of the observation unit 5 (Step S22), the target object detection server 1 determines whether the obtained data is a new data or not (Step S23).

If the target object detection server 1 determines that the obtained data is not a new data (Step S3: No), the target object detection server deletes the data (receiver information)(Step S24). If the target object detection server 1 determines that the obtained data is a new data (Step S3: Yes), the target object detection server 1 specifies the type of the data by the radio wave information classifying unit 3a of the receiver information acquiring unit 3 (Step S25) and determines whether or not the obtained information is data transmitted from the detection tag (determines whether or not the obtained data is receiver information) (Step S26).

Then, if the target object detection server 1 determines that the obtained information is not data transmitted from the detection tag T (Step S6: No), the target object detection server 1 makes the data storage unit 9 store the data through the observation unit 5 as sub-data (information on a radio wave transmitted from the robot R) (Step S27).

If the target object detection server 1 determines that the obtained information is data transmitted from the detection tag T (Step S6: Yes), the target object detection server 1 makes the detection tag transmitted radio wave information storing unit 7 store the data through the observation unit 5 as tag data (Step S28). Then, the target object detection server 1 obtains information on the target object position by the target position acquiring unit 11 and transmits the sub-data and the information on the target object position to all of the robots R (Step S29).

(Operation of the Detector (Robot))

Figure 8:
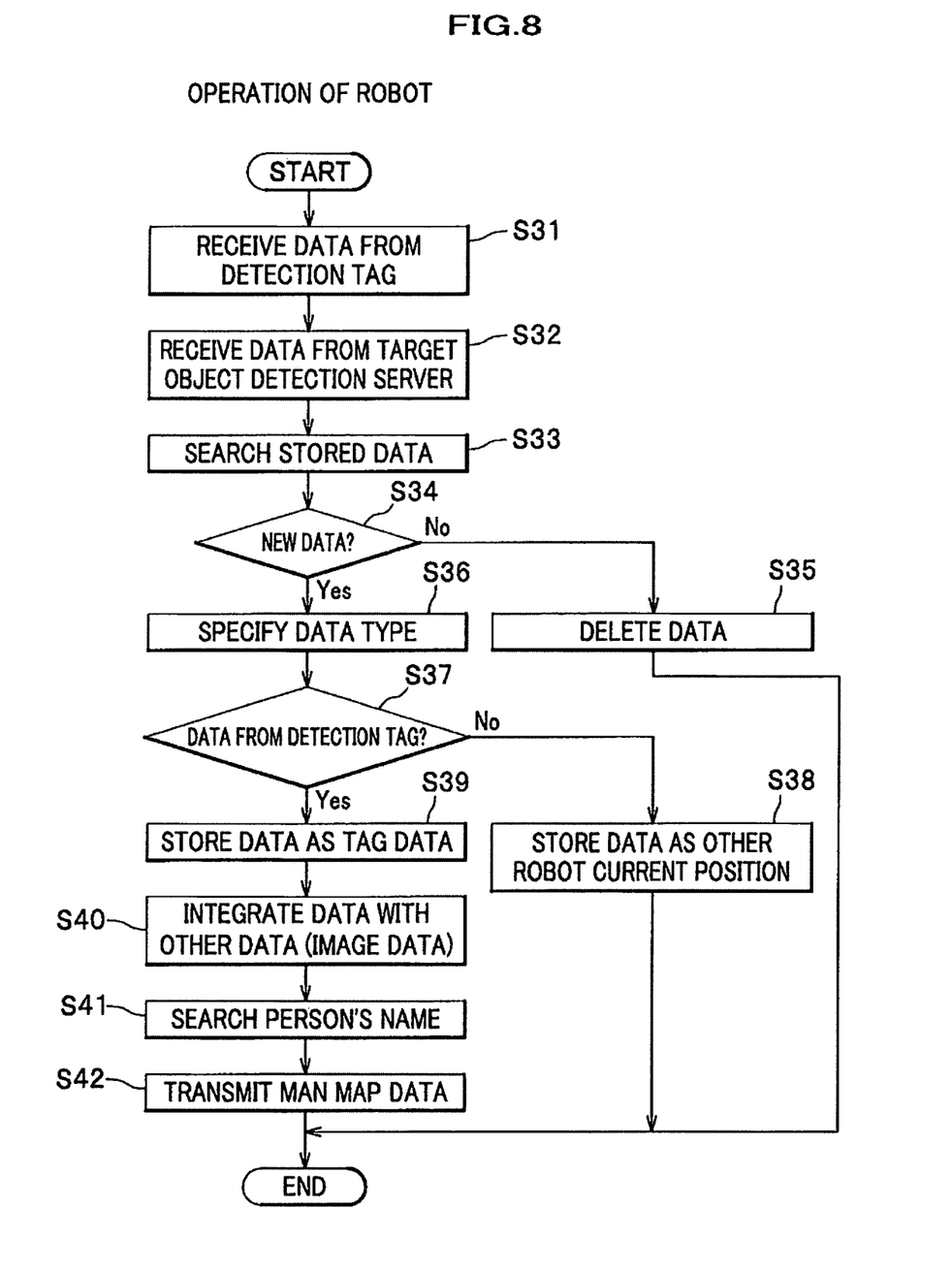
FIG. 8 is a flowchart showing an operation of the detector (robot).

Next, an operation of the robot R will be explained with reference to a flow chart shown in FIG. 8 (properly refer to FIGS. 1, 5). The robot R receives data from the detection tag (transmitted radio wave information) by means of the object detector 80 (Step S31). Or, the robot R receives data from the target object detection server 1 (information on a target object position) by means of the radio communication unit 60 (Step S32).

Then, by means of the main controller 40, the robot R retrieves data stored in the storage 30 (Step S33) and determines whether the obtained data is a new data or not (Step 34). If the robot R determines that the obtained data is not a new data (Step S34: No), the robot R deletes the obtained data (tag data) (Step S35).

If the robot R determines that the obtained data is a new data (Step S34: Yes) through the main controller, the robot R specifies the type of data (Step S36). Then, the robot R determines whether the obtained data is tag data or not (data transmitted from the detection tag which is received by the receiver 2 or the object detector 80) (Step 37).

If the robot R determines that the obtained data is not a tag data through the main controller 40 (Step S37: No), the robot R makes the storage 30 store the data as information of a current position of other robot R (Step S38), and completes the operation.

If the robot R decides that the obtained data is the tag data through the main controller 40 (Step S37: Yes), the robot R makes the storage 30 store the data as the tag data (Step S39), and integrates the data with other data such as image data (Step S40). Further, through the main controller 40, the robot R retrieves a name of a person stored in the storage 30 (Step S41), and transmits a man map data (indicating how people are located) (Step S42).

As mentioned above, embodiments of the present invention are explained. However, the present invention is not restricted in the embodiments. For example, the target object detection server 1 is provided in the outside of the detector 4 (robot R). However, it is possible that the main construction of the target object detection server 1 (except for the construction used for transmitting-receiving communication with the detector 4) is integrated into the detector 4. As shown by broken lines in FIG. 1, this integration is possible if the detector 4 can receive the information on the radio wave transmitted from the receiver 2 by means that the transmitted radio wave information from the receiver 2 is directly supplied to the base station radio transmitter-receiver 6.

What is claimed is:

1. A target object detection server for: communicating wirelessly to an autonomous mobile robot detector which detects by using a RFID detection tag mounted on an autonomously movable target object whether or not the target object exists in a surrounding area of the detector, and
connecting through a network with one or more RFID receivers which are arranged in a surrounding area of the target object and receive a radio wave transmitted from the detection tag in response to the tag receiving a detector-transmitted radio wave from the detector,
the target object detection server comprising:
a receiver information acquiring unit which obtains information associated with an receiver ID for identifying the receiver; the information including at least the tag identification number, electric field strength, and a reception time, by transmitting the information from the receiver, if the receiver receives a radio wave transmitted from the detection tag; a radio wave including information on the tag identification number for identifying the detection tag,
target position acquiring unit which obtains information on a target object position indicating where the target object is, based on receiver information obtained by the receiver information acquiring unit, and an arrangement position of the receiver which is associated beforehand with the receiver ID,
a target position transmitter for transmitting to the detector the information on the target object position obtained through the target position acquiring unit,
a task data storing unit which stores a task in which the tag identification number of the detection tag mounted on the target object is associated beforehand with a motion which the detector executes for the target object, and
a traveling control unit which instructs the mobile robot to travel toward a target object, if the tag identification number associated with the task stored in the task data storing unit is identical with the tag identification number included in the receiver information, when the mobile robot can not receive the radio wave transmitted from the detection tag and only the receiver can detect the transmitted radio wave.

2. The target object detection server according to claim 1, wherein the detector comprises:
a tag identification number storing unit which stores the tag identification number included in the radio wave transmitted from the detection tag, when the detector receives the transmitted radio wave, and
a transmitted radio wave notice signal transmitter which transmits a notice signal indicating that the transmitted radio wave is received, to the target object detection server,
the target object detection server comprising:
a transmitted radio wave notice signal receiver which receives the notice signal of receiving the radio wave transmitted from the transmitted radio wave notice signal transmitter,
a task data storing unit which stores a task in which the tag identification number of the detection tag mounted on the target object is associated beforehand with a motion which the detector executes for the target object,
a determination unit for determining whether or not the tag identification number of the detection tag mounted on the target object is identical with the tag identification number associated with a task stored in the task data storing unit, through the notice signal of receiving the detection tag transmitted radio wave; the notice signal which is received by the detection tag transmitted radio wave notice signal receiver, and
a deletion instruction unit which instructs the detector to delete the tag identification number included in the associated transmitted radio wave, from the tag identification number storing unit, if the determination unit determines that both the tag identification numbers are not identical with each other.

3. The target object detection server according to claim 1, wherein the autonomous mobile robot detector is one of a plurality of similarly configured autonomous mobile robots detectors, the target object detection server further comprising:
a task data storing unit which stores a task in which the tag identification number of the detection tag mounted on the target object is associated beforehand with a motion which the detector executes for the target object, and
a current position acquiring unit which obtains information on a current position of each mobile robot of the plurality of mobile robot detectors,
an inquiring unit which obtains a reply by inquiring of each mobile robot whether the mobile robot is executing a task or on standby, and
a traveling control unit which instructs a subset of the mobile robots among the mobile robots to travel to the target object, based on the information on the target object position obtained by the target position acquiring unit, the information on the current position of the mobile robot obtained by the current position acquiring unit, and the notification obtained by the inquiring unit.

4. The target object detection server according to claim 1, wherein the detector activates the detection tag using a radio frequency transmission that includes a detector identifier and wherein the information obtained by the receiver information acquiring unit further includes the detector identifier in association with at least the tag identification number.

5. The target object detection server according to claim 1, wherein the one or more receivers comprises one or more fixed position receivers and wherein the target object detection server stores the location of each of the one or more fixed position receivers in association with the receiver ID thereof.

6. The target object detection server according to claim 5, wherein the one or more fixed position receivers communicate with the target object detection server via a wired communication link.

7. The target object detection server according to claim 1, wherein the detector determines target object position data including a relative position of the target object to the detector based on an angle of the detection tag and a strength of the radio wave, and wherein the target object detection server receives the target object position data from the detector.

8. The target object detection server according to claim 1, wherein
the task data storing unit has a control table including content information on tasks and status information on tasks as information items,
the content information on tasks including a task ID which is a unique identifier assigned to each task, priority of a task, importance of a task, a robot ID which is an identifier for the detector executing the task, and
the status information on tasks including a start position where the task is started within a task operation area, an end position where the task is ended within the task operation area, a required time for executing the task, a scheduled time for starting the task, and a scheduled time for ending the task as information items.

* * * * *